United States Patent
Kondo

(10) Patent No.: US 10,168,422 B2
(45) Date of Patent: Jan. 1, 2019

(54) OPTICAL DISPLACEMENT SENSOR AND SYSTEM INCLUDING THE SAME

(71) Applicant: OMRON Corporation, Kyoto (JP)

(72) Inventor: Tomonori Kondo, Fukuchiyama (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 15/820,459

(22) Filed: Nov. 22, 2017

(65) Prior Publication Data
US 2018/0239003 A1    Aug. 23, 2018

(30) Foreign Application Priority Data
Feb. 22, 2017  (JP) ................................. 2017-031303

(51) Int. Cl.
G01S 7/486    (2006.01)
G01S 17/08    (2006.01)

(52) U.S. Cl.
CPC ............ *G01S 7/4868* (2013.01); *G01S 17/08* (2013.01)

(58) Field of Classification Search
CPC ................................ G01S 7/4868; G01S 17/08
USPC .................................................. 356/614–624
See application file for complete search history.

(56) References Cited

U.S. PATENT DOCUMENTS

2009/0050793 A1 *   2/2009   Asano ................ A63B 69/3614
250/221

FOREIGN PATENT DOCUMENTS

JP    2001280951    10/2001

\* cited by examiner

*Primary Examiner* — Tri T Ton
(74) *Attorney, Agent, or Firm* — JCIPRNET

(57) ABSTRACT

An optical displacement sensor and a system are provided. The optical displacement sensor includes a light projecting unit that projects light onto a workpiece, a light receiving unit that receives light reflected from the workpiece and generates light receiving data, a processing unit that calculates a displacement amount of the workpiece on the basis of the light receiving data, an input unit that receives a timing synchronization signal, and an output unit that outputs the displacement amount calculated by the processing unit. The processing unit controls, in response to the timing synchronization signal received through the input unit, an exposure duration determined by an overlap between a duration during which the light projecting unit projects light onto the workpiece and a duration during which the light receiving unit receives the reflected light. The system includes the optical displacement sensor and a control device that generates the timing synchronization signal.

6 Claims, 7 Drawing Sheets

OPTICAL DISPLACEMENT SENSOR AND SYSTEM INCLUDING THE SAME

CROSS-REFERENCE TO RELATED APPLICATION

This application claims the priority benefit of Japan Application no. 2017-031303, filed on Feb. 22, 2017. The entirety of the above-mentioned patent application is hereby incorporated by reference herein and made a part of this specification.

BACKGROUND OF THE INVENTION

Field of the Invention

The disclosure relates to an optical displacement sensor and a system including the optical displacement sensor.

Description of Related Art

An optical displacement sensor that optically measures a target displacement (such as a movement amount or a size) is known. For example, Japanese Unexamined Patent Application Publication No. 2001-280951 (Patent Document 1) discloses an optical displacement sensor that includes a light projecting unit, a light receiving unit, and a calculation unit.

RELATED ART DOCUMENT

Patent Documents

[Patent Document 1] Japanese Unexamined Patent Application Publication No. 2001-280951

The optical displacement sensor described in Japanese Unexamined Patent Application Publication No. 2001-280951 (Patent Document 1) performs measurement in a free-run manner. It can be considered that there are optimum timings of exposure for measurement according to a user's usage. However, the above sensor cannot expose the measurement object with light at timings appropriate for the user's usage.

SUMMARY OF THE INVENTION

One or some exemplary embodiments of the invention provide an optical displacement sensor which sets optimum exposure timings according to a user's usage, and a system including the optical displacement sensor.

An optical displacement sensor according to an aspect of the invention includes a light projecting unit configured to project light onto a measurement object, a light receiving unit configured to receive light reflected from the measurement object and to generate light receiving data, a processing unit configured to calculate a displacement amount of the measurement object on the basis of the light receiving data, an input unit configured to receive a timing synchronization signal, and an output unit configured to output the displacement amount calculated by the processing unit. The processing unit is configured to control, in response to the timing synchronization signal received through the input unit, an exposure duration determined by an overlap between a duration during which the light projecting unit projects light onto the measurement object and a duration during which the light receiving unit receives the reflected light.

A system according to an aspect of the invention includes at least one optical displacement sensor described above and a control device configured to generate the timing synchronization signal.

DESCRIPTION OF THE EMBODIMENTS

Figure 1:
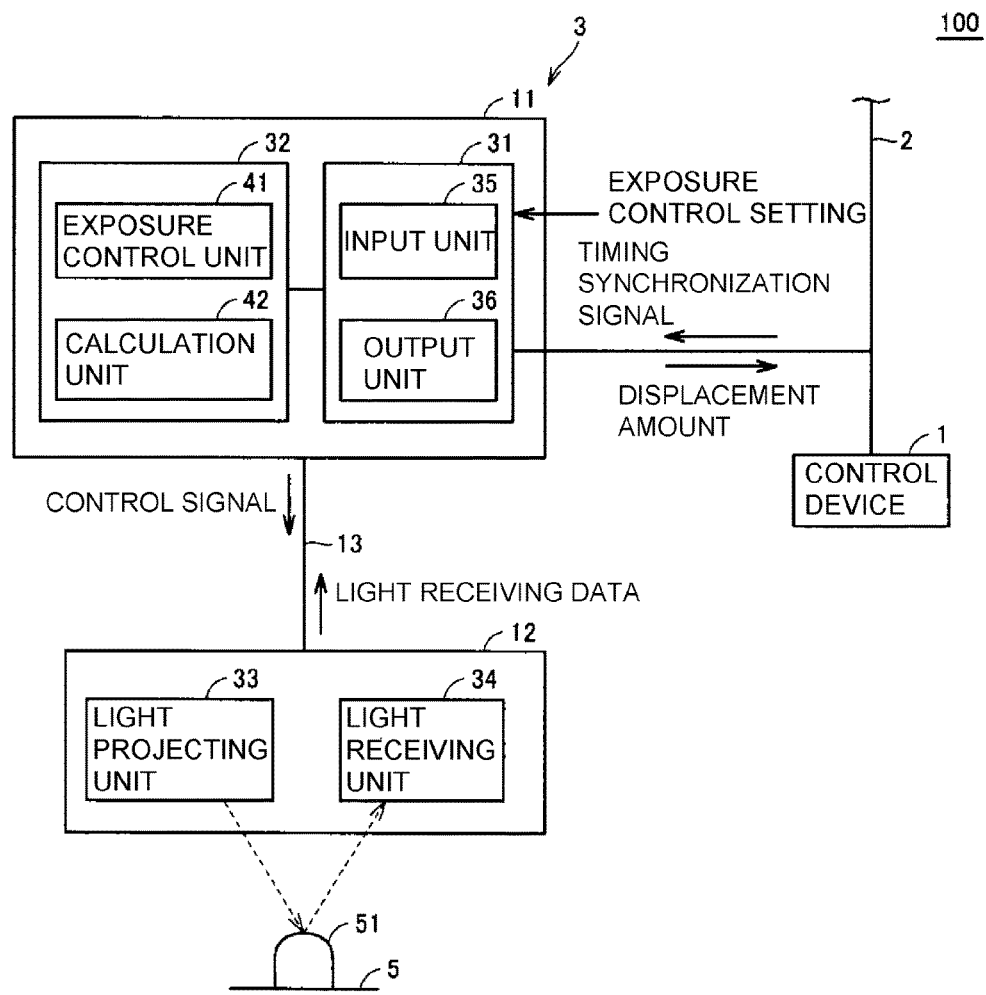
FIG. 1 is a diagram showing a configuration of a system including an optical displacement sensor according to an embodiment of the invention.

According to the embodiments of the invention, t is possible to provide an optical displacement sensor and a system which can set optimum exposure timings according to the user's usage.

In one or some exemplary embodiments of the invention, the processing unit is configured to make a start timing of the exposure duration coincide with a start timing of a measurement period of the displacement amount.

In one or some exemplary embodiments of the invention, the processing unit is configured to make an end timing of the exposure duration coincide with an end timing of a measurement period of the displacement amount.

In one or some exemplary embodiments of the invention, the processing unit is configured to make a center timing of the exposure duration coincide with a center timing of a measurement period of the displacement amount.

In one or some exemplary embodiments of the invention, the input unit is configured to receive a setting of a user regarding control of the exposure duration. The processing unit is configured to select, on the basis of the setting, one of a plurality of controls including at least two of first control for making a start timing of the exposure duration coincide with a start timing of a measurement period of the displacement amount, second control for making an end timing of the exposure duration coincide with an end timing of the measurement period, and third control for making a center timing of the exposure duration coincide with a center timing of the measurement period.

In one or some exemplary embodiments of the invention, the at least one optical displacement sensor includes a first optical displacement sensor and a second optical displacement sensor. The light projecting unit and the light receiving unit of the first optical displacement sensor and the light projecting unit and the light receiving unit of the second optical displacement sensor are arranged opposite each other across the measurement object. The processing unit of each of the first optical displacement sensor and the second optical displacement sensor is configured to make a center timing of the exposure duration coincide with a center timing of the measurement period of the displacement amount.

Embodiments of the invention will be described in detail with reference to the drawings. In the drawings, the same or corresponding parts are denoted by the same reference numerals and descriptions thereof will not be repeated.

FIG. 1 is a diagram showing a configuration of a system including an optical displacement sensor according to an embodiment of the invention. As shown in FIG. 1, the system 100 includes a control device 1, a communication line 2, and an optical displacement sensor 3. The control device 1 can be realized, for example, by a programmable logic controller (PLC).

The control device 1 sends a timing synchronization signal to the optical displacement sensor 3 at a predetermined measurement timing. The optical displacement sensor 3 receives the timing synchronization signal via the communication line 2 and images a workpiece (measurement object) 51 placed on a stage 5. The optical displacement sensor 3 calculates a displacement of the workpiece 51 from light receiving data obtained by the imaging and sends the calculated displacement amount to the control device 1. The control device 1 acquires the displacement amount via the communication line 2 and calculates a measurement value such as the thickness or the step of the workpiece 51 from the displacement amount.

The optical displacement sensor 3 includes a sensor controller 11, a sensor head 12, and a cable 13. The sensor head 12 is connected to the sensor controller 11 by a cable 13.

The sensor controller 11 includes an interface unit 31 and a processing unit 32. The interface unit 31 is connected to the communication line 2. The interface unit 31 includes an input unit 35 and an output unit 36. The input unit 35 receives the timing synchronization signal from the control device 1 via the communication line 2. The output unit 36 outputs the displacement amount calculated by the optical displacement sensor 3 to the control device 1 via the communication line 2.

The processing unit 32 can be realized, for example, by a semiconductor integrated circuit such as a central processing unit (CPU) or a field programmable gate array (FPGA). The processing unit 32 includes an exposure control unit 41 and a calculation unit 42.

In response to the timing synchronization signal, the exposure control unit 41 generates a control signal for controlling the exposure timings of the sensor head 12 and transmits the control signal to the sensor head 12 via the cable 13. Details of the exposure control will be described later in detail.

The calculation unit 42 receives the light receiving data sent from the sensor head 12 and calculates the current displacement amount (measurement value) of the workpiece 51 from the light receiving data. The calculated displacement amount is sent from the calculation unit 42 to the output unit 36.

The sensor head 12 has a light projecting unit 33 and a light receiving unit 34. The light projecting unit 33 projects light onto the workpiece 51 in accordance with a control signal. In accordance with a control signal, the light receiving unit 34 receives light reflected from the workpiece 51 and outputs light receiving data representing the received amount of light.

Figure 2:
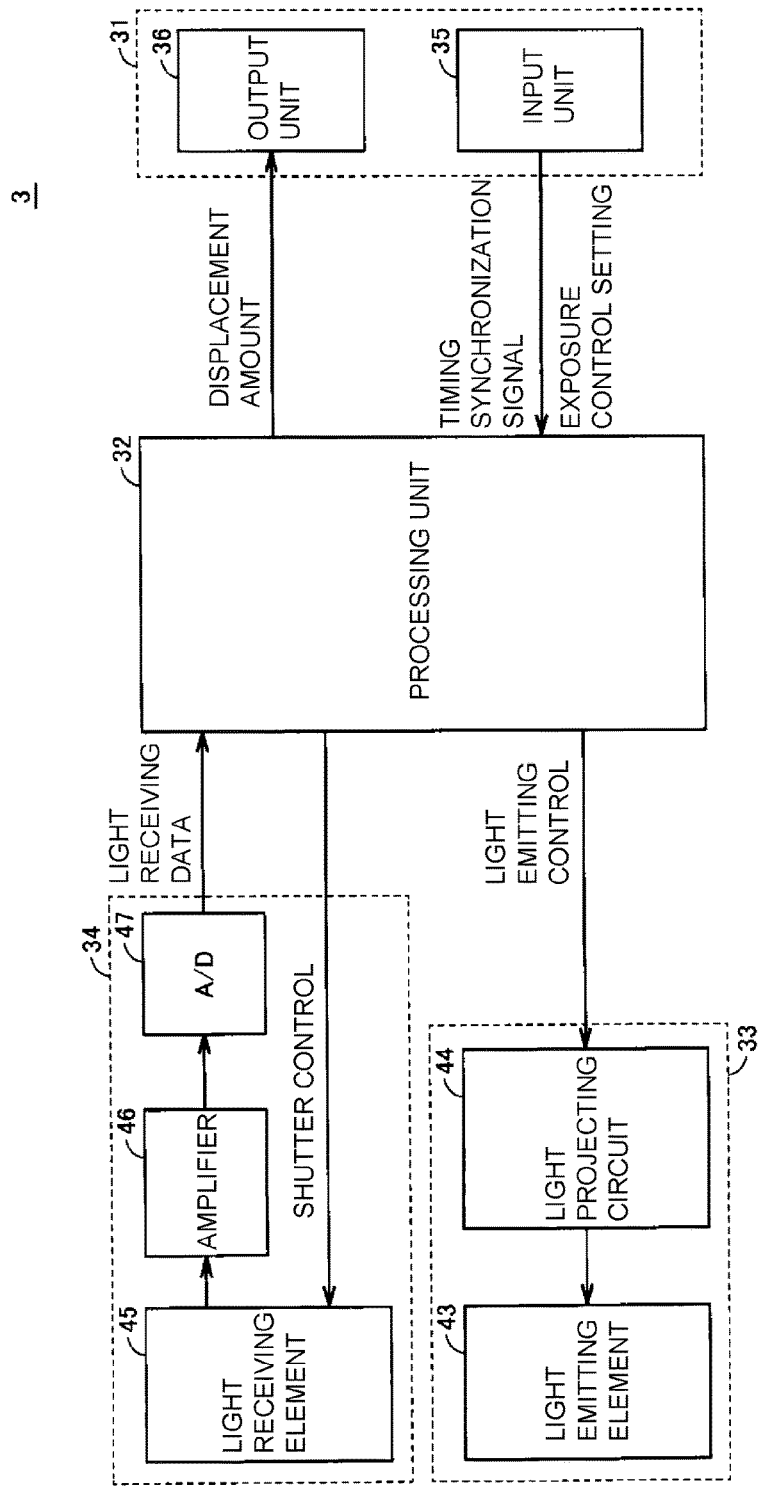
FIG. 2 is a block diagram illustrating a configuration of the optical displacement sensor shown in FIG. 1.

FIG. 2 is a block diagram illustrating a configuration of the optical displacement sensor shown in FIG. 1. As shown in FIG. 2, the light projecting unit 33 includes a light emitting element 43 serving as a light source and a light projecting circuit 44. The light receiving unit 34 includes a light receiving element 45, an amplifier 46, and an A/D converter 47. The light receiving element 45 is an imaging element such as a CCD image sensor, a CMOS image sensor, or the like, and has a shutter function.

Exposure control methods according to the embodiment of the invention will now be described with reference to FIG. 2. The processing unit 32 switches exposure control methods according to a setting of a user. The processing unit 32 receives the timing synchronization signal and performs exposure control. Specifically, the exposure control is light emission control of the light emitting element 43 and shutter control of the light receiving element 45. The light projecting circuit 44 turns on the light emitting element 43 according to the light emission control of the processing unit 32. Specifically, the light projecting unit 33 emits light at a timing specified by the user with reference to the synchronization timing signal.

The processing unit 32 also controls the shutter of the light receiving element 45. The shutter of the light receiving element 45 is opened at the start of a prescribed exposure period and is closed at the end of the exposure period. In the present embodiment, the shutter open duration of the light receiving element 45 is longer than the light projection duration of the light projecting unit 33. Therefore, the light receiving element 45 receives light that is reflected from the workpiece while the light projecting unit 33 projects light onto the workpiece. As a result, electric charge is accumulated in the light receiving element 45.

When the exposure is completed, electric charge accumulated in the light receiving element 45 is output from the light receiving element 45 as a light receiving signal, and the light receiving signal is input to the amplifier 46. The amplifier 46 amplifies the light receiving signal output from the light receiving element 45. The A/D converter 47 converts the output signal of the amplifier 46 into a digital signal to generate light receiving data. The light receiving data is output from the light receiving unit 34 and input to the processing unit 32. The processing unit 32 calculates a displacement amount from the light receiving data.

In the present embodiment, the sensor head 12 and the sensor controller 11 are separated from each other. However, in embodiments of the invention, the light projecting unit and the light receiving unit may be incorporated into the sensor controller 11.

Figure 3:
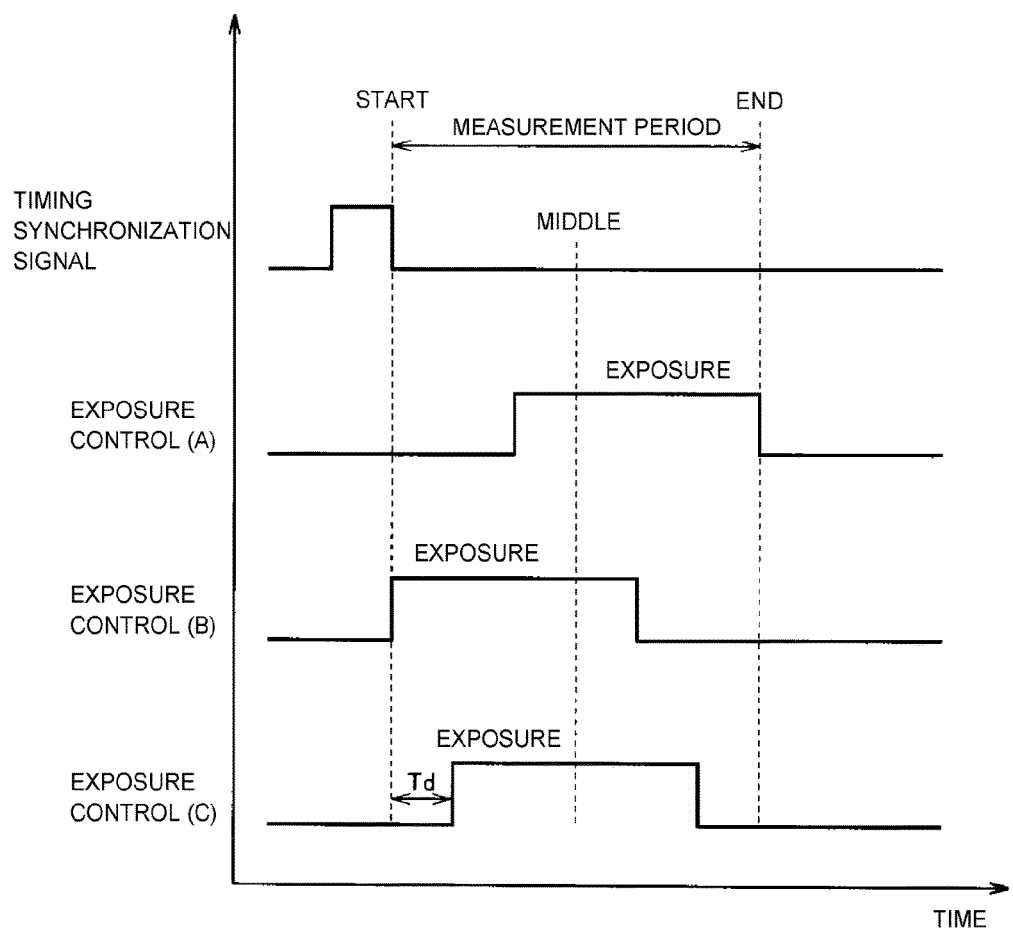
FIG. 3 is a waveform diagram illustrating exposure control according to the embodiment of the invention.

FIG. 3 is a waveform diagram illustrating exposure control according to the embodiment of the invention. As shown in FIG. 3, for example, a falling edge of a timing synchronization signal indicates the start timing of a measurement period. Alternatively, a rising edge of the timing synchronization signal may indicate the start timing of the measurement period.

The exposure duration corresponds to a time during which the shutter open duration of the light receiving element 45 (see FIG. 2) and the light projection duration of the light emitting element 43 (see FIG. 2) overlap. Therefore, during the exposure duration, the light receiving element 45 receives light reflected from the workpiece and accumulates electric charge.

In the embodiment of the invention, the optical displacement sensor 3 can select one of exposure control patterns (A) to (C) which are described below. The processing unit 32 can switch the exposure control patterns by receiving a setting of a user via the input unit 35. Therefore, according to the embodiment of the invention, it is possible to select an optimum exposure method according to the user's usage.

When the exposure control pattern (A) is selected, exposure is controlled such that the end timing of the exposure coincides with the end timing of the measurement period. When the exposure control pattern (B) is selected, exposure is controlled such that the start timing of the exposure coincides with the start timing of the measurement period. When the exposure control pattern (C) is selected, exposure is controlled such that the center of the exposure duration coincides with the center of the measurement period.

A plurality of exposure control patterns used in the embodiment of the invention may be any two of the exposure control patterns (A) to (C). The plurality of exposure control patterns may also include other exposure control patterns in addition to the exposure control patterns (A) to (C). For example, exposure may be controlled such that the exposure starts when a delay time Td has elapsed from the start of the measurement period (see a waveform of the exposure control pattern (C)). The delay time Td may be fixed or may be settable by the user.

In another embodiment of the invention, the processing unit 32 of the optical displacement sensor 3 may have only one of the exposure control patterns (A), (B), and (C) shown in FIG. 3. That is, the number of exposure control patterns is not limited to a plurality of exposure control patterns.

Figure 4:
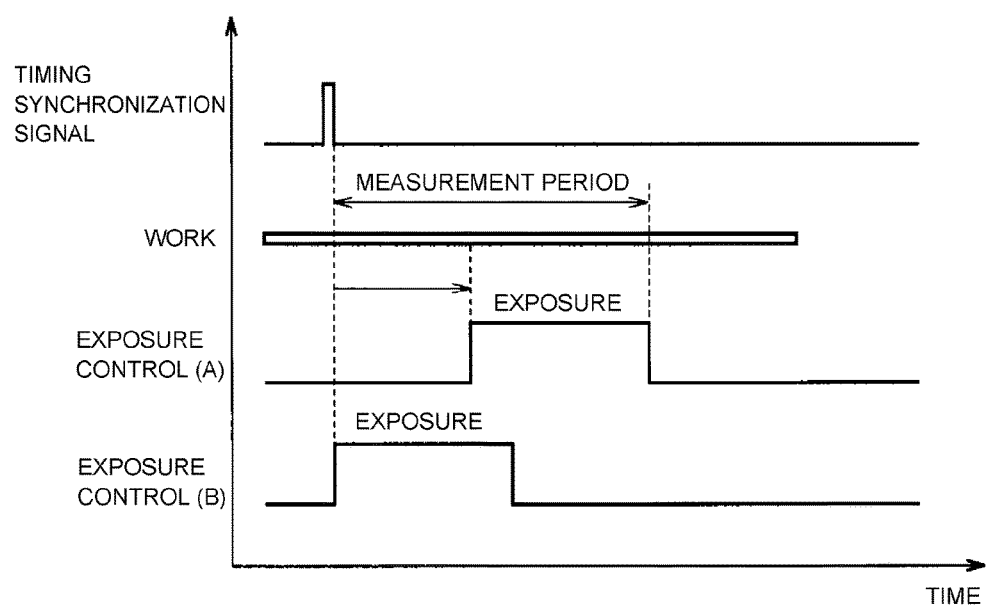
FIG. 4 is a diagram illustrating an exemplary application of exposure control according to the embodiment of the invention.

FIG. 4 is a diagram illustrating an exemplary application of exposure control according to the embodiment of the invention. FIG. 4 shows an example of displacement measurement of the workpiece 51 (see FIG. 1) for 3D mapping.

Input of a timing synchronization signal to the optical displacement sensor 3 starts a measurement period. Every measurement period, the workpiece 51 is imaged and the optical displacement sensor 3 calculates a displacement amount (a measurement value). The optical displacement sensor 3 outputs the measurement value to the outside.

For example, in the case of the exposure control pattern (A), the optical displacement sensor 3 exposes the workpiece 51 with light during a necessary time with reference to the end of the measurement period. However, since the workpiece 51 moves relative to the sensor head 12 of the optical displacement sensor 3, a position of the workpiece 51 at the start of exposure (at the start of imaging) deviates from a position of the workpiece 51 that is desired to be measured.

In the case of imaging the workpiece 51 with a plurality of optical displacement sensors 3, measurement values are close to the average of positions of the workpiece 51 within the exposure duration. However, when the exposure durations of the plurality of sensors differ, errors easily occur in the measurement values.

In this exemplary application, control (of an exposure control pattern (B) shown in FIG. 3) for making the start timing of the exposure duration coincide with the start timing of the measurement period is appropriate. By selecting the exposure control pattern (B), it is possible to reduce the deviation of the position of the workpiece at the time of imaging from the position of the workpiece that is desired to be measured.

Figure 5:
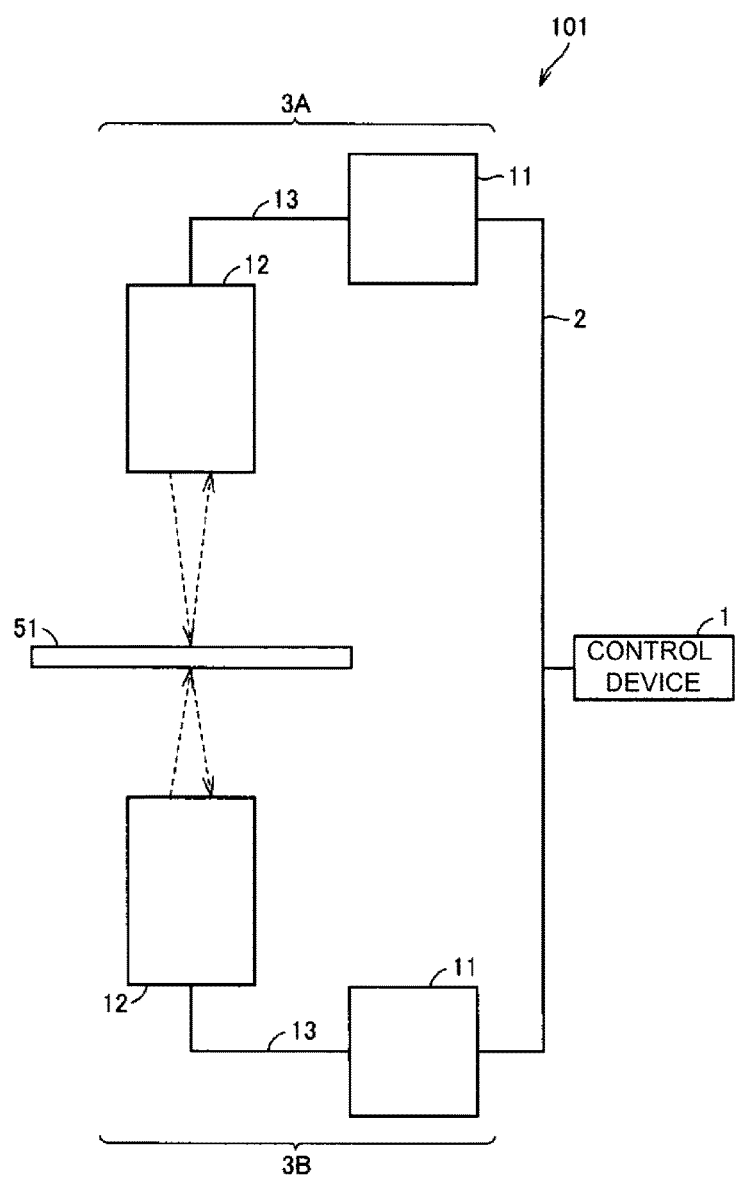
FIG. 5 is a diagram illustrating another exemplary application of exposure control according to the embodiment of the invention

FIG. 5 is a view illustrating another exemplary application of exposure control according to the embodiment of the invention. FIG. 5 shows an exemplary configuration of a system for measuring the thickness of the workpiece 51 (see FIG. 1) as a displacement amount. The system 101 includes a control device 1, a communication line 2, and optical displacement sensors 3A and 3B. The configuration of each of the optical displacement sensors 3A and 3B is the same as that of the optical displacement sensor 3 (see FIG. 1) and therefore the subsequent descriptions thereof will not be repeated. A sensor head 12 of the optical displacement sensor 3A and a sensor head 12 of the optical displacement sensor 3B are arranged to face each other. That is, a light projecting unit and a light receiving unit of the optical displacement sensor 3A and a light projecting unit and a light receiving unit of the optical displacement sensor 3B are arranged opposite each other across the workpiece 51.

Figure 6:
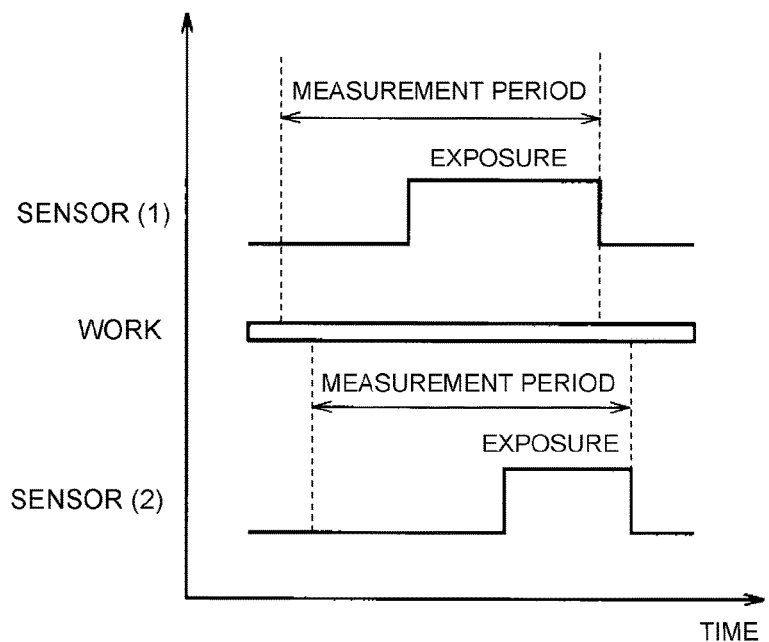
FIG. 6 is a diagram showing exposure timings of two optical displacement sensors of the system shown in FIG. 5 when exposure timings of the two optical displacement sensors are not synchronized.

FIG. 6 is a diagram showing exposure timings of the two optical displacement sensors of the system shown in FIG. 5 when the exposure timings of the two optical displacement sensors are not synchronized. In FIG. 6, "sensor (1)" represents the optical displacement sensor 3A and "sensor (2)" represents the optical displacement sensor 3B (the same applies to the following drawings). The optical displacement sensor 3A and 3B expose the workpiece 51 with light at their respective exposure timings. Therefore, the deviation between the exposure timings of the optical displacement sensors 3A and 3B tends to increase. Measurement errors tend to increase as the deviation of the exposure timing increases.

Figure 7:
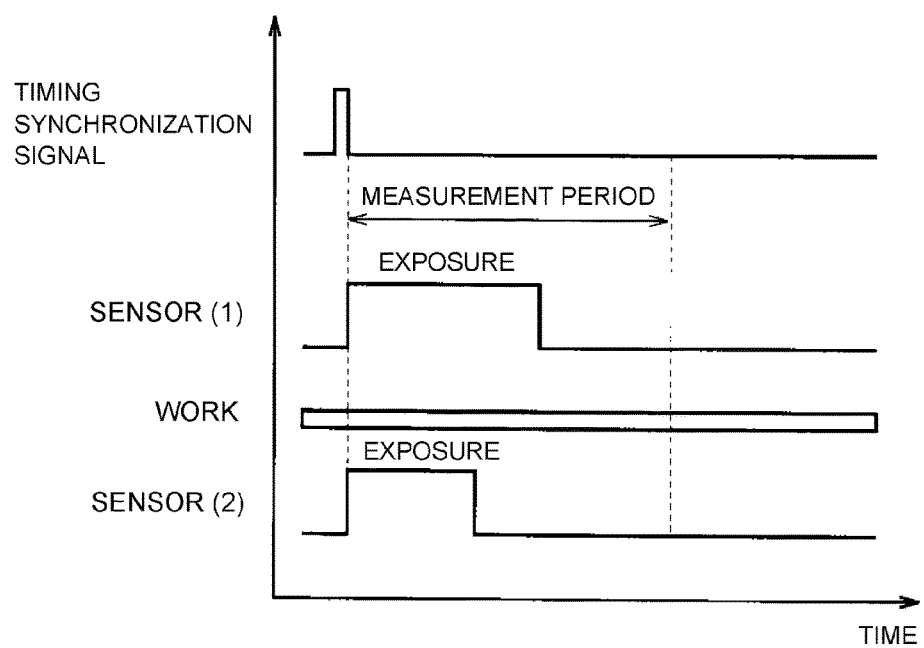
FIG. 7 is a diagram showing exposure timings when exposure control according to the embodiment of the invention is applied to the system shown in FIG. 5.

FIG. 7 is a diagram showing exposure timings when exposure control according to the embodiment of the invention is applied to the system shown in FIG. 5. As shown in FIG. 7, the exposure timings are determined with reference to a timing synchronization signal. The processing unit 32 (the exposure control unit 41) of each of the optical displacement sensors 3A and 3B starts exposure in synchronization with the timing synchronization signal. Specifically, the exposure control unit 41 of each of the optical displacement sensors 3A and 3B makes the start timing of the exposure coincide with the start of the measurement period.

According to this control, the exposure start timings of the optical displacement sensors 3A and 3B can be made uniform. Since it is possible to reduce the deviation between exposure timings, it is possible to reduce the deviation between a target position and a position at which a displacement of the workpiece 51 is measured. Therefore, in the system 101 shown in FIG. 5, it is possible to reduce errors in measurement of the thickness of the workpiece 51.

The optical displacement sensors 3A and 3B perform exposure for their necessary times. Therefore, the lengths of the exposure durations of the optical displacement sensors 3A and 3B may differ. When the thickness of the workpiece 51 is measured in the system shown in FIG. 5, there is a possibility that a measurement error may occur due to fluttering, vibration, or the like of the workpiece 51.

Figure 8:
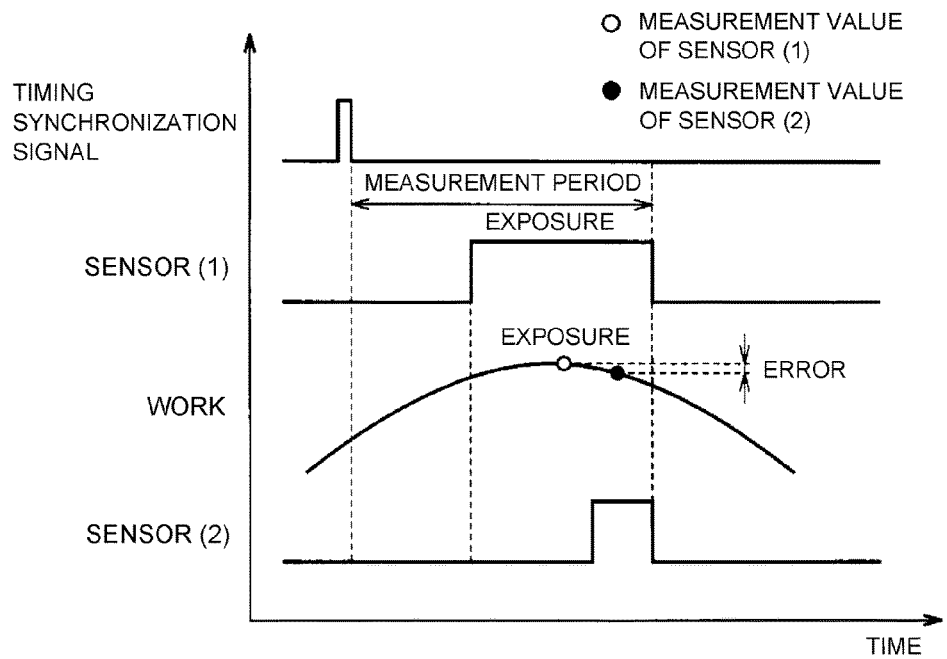
FIG. 8 is a diagram illustrating an error occurring when the thickness of a workpiece is measured by two optical displacement sensors.

FIG. 8 is a diagram illustrating an error occurring when the thickness of a workpiece is measured by two optical displacement sensors. As shown in FIG. 8, measurement values are near the average of positions of the workpiece within the exposure duration. The lengths of the exposure durations of the optical displacement sensors 3A and 3B differ. Therefore, when the exposure timings of the optical displacement sensors 3A and 3B are determined with reference to the end of the measurement period, the measurement values of the optical displacement sensors 3A and 3B may differ. Thus, measurement errors tend to increase.

Figure 9:
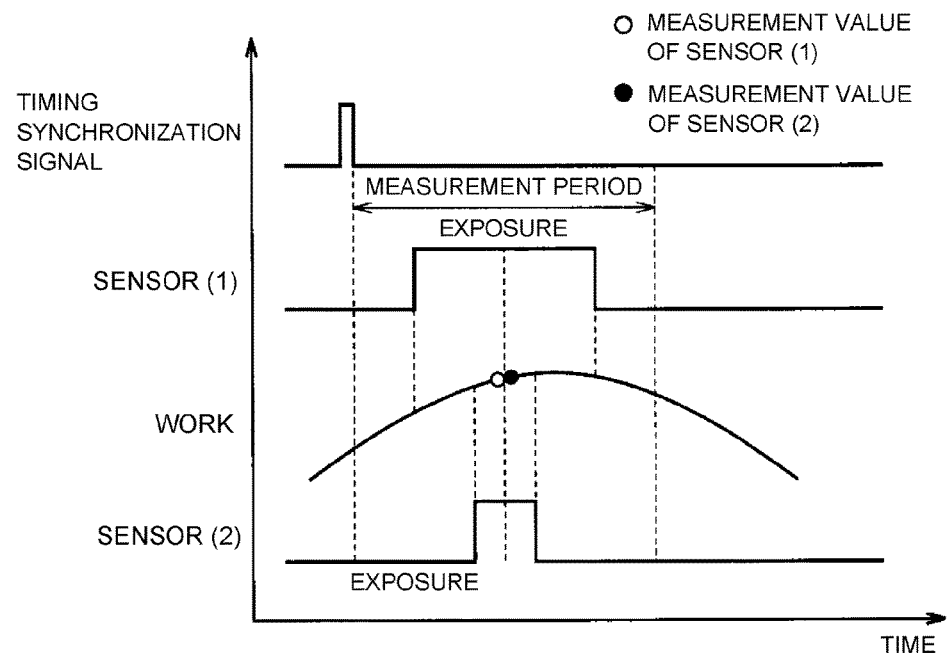
FIG. 9 is a diagram showing the exposure timings of exposure control according to the embodiment of the invention when fluctuations in position of the workpiece are taken into consideration.

FIG. 9 is a diagram showing the exposure timings of exposure control according to the embodiment of the invention when fluctuations in position of the workpiece are taken into consideration. As shown in FIG. 9, the exposure control unit 41 of each of the optical displacement sensors 3A and 3B sets the exposure timings of a corresponding one of the optical displacement sensors 3A and 3B such that the center of the measurement period coincides with the center of the exposure duration. This can reduce measurement errors even when the exposure durations of the optical displacement sensors 3A and 3B differ.

As described above, the exposure duration is determined by the light projection timings of the light projecting element and the shutter timings of the light receiving element. In the embodiment of the invention, the exposure duration is controlled according to the timing synchronization signal input from the outside of the optical displacement sensor. Thus, it is possible to perform exposure at arbitrary timings. This enables more accurate displacement measurement.

The embodiment of the invention can be widely applied to an optical displacement sensor that controls the exposure duration by the shutter duration of an imaging element or the turn-on duration of a light source. Thus, the methods for measuring a displacement are not particularly limited and the invention can be applied, for example, to a displacement sensor of triangulation type, a displacement sensor of coaxial confocal type, and the like.

The embodiments disclosed herein should be considered to be illustrative in all respects and not restrictive. The scope of the invention is indicated by the appended claims rather than by the foregoing description, and the invention is intended to include all modifications within the concept and scope equivalent to the claims.

What is claimed is:

1. An optical displacement sensor comprising:
   a light source configured to project light onto a measurement object;
   an image sensor configured to receive light reflected from the measurement object;
   an analog to digital converter configured to generate light receiving data based on the light reflected from the measurement object;
   a processor configured to calculate a displacement amount of the measurement object on the basis of the light receiving data;
   an input connector configured to receive a timing synchronization signal; and
   an output connector configured to output the displacement amount calculated by the processor,
   wherein the processor is configured to control, in response to the timing synchronization signal received through the input connector, an exposure duration determined by an overlap between a duration during which the light source projects light onto the measurement object and a duration during which the image sensor receives the reflected light,
   wherein the processor is further configured to make a start timing of the exposure duration coincide with a start timing of a measurement period of the displacement amount, to make an end timing of the exposure duration coincide with an end timing of the measurement period of the displacement amount, or to make a center timing of the exposure duration coincide with a center timing of the measurement period of the displacement amount.

2. The optical displacement sensor according to claim 1, wherein the input connector is configured to receive a setting of a user regarding control of the exposure duration, and
   the processor is further configured to select, on the basis of the setting, one of a plurality of controls comprising at least two of:
   first control for making the start timing of the exposure duration coincide with the start timing of the measurement period of the displacement amount;
   second control for making the end timing of the exposure duration coincide with the end timing of the measurement period; and
   third control for making the center timing of the exposure duration coincide with the center timing of the measurement period.

3. A system comprising at least one optical displacement sensor according to claim 1 and a control device configured to generate the timing synchronization signal.

4. A system comprising at least one optical displacement sensor according to claim 2 and a control device configured to generate the timing synchronization signal.

5. The system according to claim 3, wherein the at least one optical displacement sensor comprises a first optical displacement sensor and a second optical displacement sensor,
   the light source and the image sensor of the first optical displacement sensor and the light source and the image sensor of the second optical displacement sensor are arranged opposite each other across the measurement object, and
   the processor of each of the first optical displacement sensor and the second optical displacement sensor is further configured to make the center timing of the exposure duration coincide with the center timing of the measurement period of the displacement amount.

6. The system according to claim 4, wherein the at least one optical displacement sensor comprises a first optical displacement sensor and a second optical displacement sensor,
   the light source and the image sensor of the first optical displacement sensor and the light source and the image sensor of the second optical displacement sensor are arranged opposite each other across the measurement object, and
   the processor of each of the first optical displacement sensor and the second optical displacement sensor is configured to make the center timing of the exposure duration coincide with the center timing of the measurement period of the displacement amount.

* * * * *